US006938055B2

(12) United States Patent
Iida et al.

(10) Patent No.: US 6,938,055 B2
(45) Date of Patent: Aug. 30, 2005

(54) DATA PROCESSING SYSTEM AND METHOD AND STORAGE MEDIUM STORING DATA PROCESSING PROGRAM

(75) Inventors: Takuro Iida, Tokyo (JP); Shuichi Kamimura, Tokyo (JP); Mutsumi Fujihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 412 days.

(21) Appl. No.: 10/108,647

(22) Filed: Mar. 29, 2002

(65) Prior Publication Data

US 2002/0143765 A1 Oct. 3, 2002

(30) Foreign Application Priority Data

Mar. 30, 2001 (JP) ...................................... 2001-099095

(51) Int. Cl.$^7$ .............................................. G06F 17/30
(52) U.S. Cl. ........................... 707/201; 707/8; 707/10; 707/104.1; 707/200; 709/221; 709/223
(58) Field of Search .......................... 707/8, 10, 104.1, 707/200, 201–203; 709/201, 221, 223; 718/101

(56) References Cited

U.S. PATENT DOCUMENTS

| | | | | |
|---|---|---|---|---|
| 4,875,159 A | * | 10/1989 | Cary et al. ................... | 707/203 |
| 5,781,910 A | * | 7/1998 | Gostanian et al. .......... | 707/201 |
| 5,926,819 A | | 7/1999 | Doo et al. | |
| 5,953,719 A | * | 9/1999 | Kleewein et al. ............... | 707/8 |
| 5,956,489 A | * | 9/1999 | San Andres et al. ........ | 709/221 |
| 5,991,771 A | * | 11/1999 | Falls et al. ................... | 707/202 |
| 6,018,770 A | * | 1/2000 | Little et al. .................. | 709/223 |
| 6,321,374 B1 | * | 11/2001 | Choy .......................... | 717/106 |
| 6,460,055 B1 | * | 10/2002 | Midgley et al. ............. | 707/204 |
| 6,513,056 B1 | * | 1/2003 | Copeland et al. ........... | 718/101 |

FOREIGN PATENT DOCUMENTS

EP          0 351 210          1/1990

OTHER PUBLICATIONS

Dominic J. Delmolino: "Strategies and Techniques for Using Oracle7 Replication", 1995, Oracle Corporation, XP002267343, P 1–25.*
D. J. Delmolino, Oracle Corporation, 'Online!, http://www.indiana.edu/{dbateam/resources/tips/ddelmoli,pdf., XP–002267343, pp. 1–25, "Strategies and Techniques for Using Oracle7 Replication", 1995.

* cited by examiner

*Primary Examiner*—Charles Rones
*Assistant Examiner*—Jacques Veillard
(74) *Attorney, Agent, or Firm*—Oblon, Spivak, McClelland, Maier & Neustadt, P.C.

(57) ABSTRACT

A data processing system is provided for quickly and appropriately handling alteration to shared data stored in main-memory areas of a plurality of machines connected via a network. The system has a transaction acceptor for accepting a request for executing the transaction, a transaction-execution manager for managing the execution of the transaction, a transaction executor for executing the transaction, a transcription processor for reflecting updated data sent from the base host on the replica data, a data monitor for monitoring whether data has been altered, and a register/deleter for registering/deleting positional information on at least a piece of data to be monitored for alteration to the data contents and an alteration-synchronizing transaction to be executed when the data has been altered, the alteration-synchronizing transaction being registered/deleted in relation to the data. On detection of alteration made to the data being monitored by the data monitor, the alteration-synchronizing transaction registered in relation to the altered data is read out and executed by the transaction executor.

11 Claims, 8 Drawing Sheets

DATA PROCESSING SYSTEM AND METHOD AND STORAGE MEDIUM STORING DATA PROCESSING PROGRAM

CROSS REFERENCE TO RELATED APPLICATIONS

This application claims benefit of priority under 35USC §119 to Japanese Patent Application No. 2001-99095 filed on Mar. 30, 2001 in Japan, the entire contents of which are incorporated by reference herein.

BACKGROUND OF THE INVENTION

The present invention relates to a data processing system and a data processing method for appropriately synchronizing transactions to be executed at several machines connected to a network.

Database systems for real-time monitoring and controlling of data shared by computers distributed over a network have to process (search and update) a huge amount of data at a high speed. Such database performance thus depends on data-management systems that provide a means of accessing those data. Enhanced data-management systems could manage all data on a main-memory area, which are usually stored on an external storage device such as a hard disk. Increased storage capacity for main memories has allowed all data to remain in a main-memory area as resident data even in the present hardware environments.

Mere caching of a data-managing system on a main-memory area to known external storage devices cannot achieve high performance for real-time applications. There are two reasons for such a drawback: (1) a huge amount of data has to be transferred between an application and a data-managing system; and (2) execution of algorithms designed for disc storage devices on a main-memory area of each computer cannot achieve high performance. In addition, limited functions of such algorithms designed for disc storage devices and provided by a data-managing system cannot lighten loads for development of applications, nonetheless achieving high-speed processing a little bit.

Moreover, known data management systems have drawbacks discussed below.

Each application has a data-monitoring program for periodically monitoring data in the known systems. The period of watching data alteration is set at each application. It is thus impossible to set an approriate data-monitoring period over several applications, so that alteration made to data cannot be detected immediately. This forces each application to check whether data alteration has been made. Furthermore, each application must have a specific program that will start in synchronism with data alteration.

SUMMARY OF THE INVENTION

In order to solve the problems discussed above, a purpose of the present invention is to provide a data system, a data processing method and a computer readable medium containing a data processing program, in which several machines in a network co-operate to manage data so that identical data can always be resident at main-memory areas over the several machines even if any alteration is made to common data, with registration of alteration-synchronizing transactions at each host, which will be executed in synchronism with the data alteration.

A data processing system for executing a transaction of accessing a database stored in each main-memory area of a plurality of computers connected via a network, a computer storing original data of at least a piece of data of the database being a base host, at least one another computer storing replica data of the original data as a replica host, according to an embodiment of the present invention, includes: a transaction acceptor configured to accept a request for executing the transaction; a transaction executor configured to execute the transaction; a transcription processor configured to reflect updated data sent from the base host on the replica data; a data monitor configured to monitor whether data has been altered; and a register/deleter configured to register/delete positional information on data to be monitored for alteration to the data contents and an alteration-synchronizing transaction to be executed when the data has been altered, the alteration-synchronizing transaction being registered/deleted in relation to the data, wherein, the alteration-synchronizing transaction registered in relation to the altered data is read out and executed by the transaction executor on detection of alteration made to the data being monitored by the data monitor.

A data processing method of executing a transaction of accessing a database stored in each main-memory area of a plurality of computers connected via a network, a computer storing original data of at least a piece of data of the database being a base host, at least one another computer storing replica data of the original data as a replica host, according to an embodiment of the present invention, includes: registering positional information on data to be monitored for alteration to the data contents and an alteration-synchronizing transaction to be executed when the data is altered, the alteration-synchronizing transaction being registered in relation to the data; monitoring whether alteration has been made to the data under monitoring; and reading and executing the alteration-synchronizing transaction registered in relation to the altered data.

In a computer readable medium containing an executable data processing program for executing a transaction of accessing a database stored in each main-memory area of a plurality of computers connected via a network, a computer storing original data of at least a piece of data of the database being a base host, at least one another computer storing replica data of the original data as a replica host, according to an embodiment of the present invention, the program has instructions for: registering positional information on data to be monitored for alteration to the data contents and an alteration-synchronizing transaction to be executed when the data has been altered, the alteration-synchronizing transaction being registered in relation to the data; monitoring whether alteration is made to the data under monitoring; and reading and executing the alteration-synchronizing transaction registered in relation to the altered data.

DETAILED DESCRIPTION OF EMBODIMENTS

Embodiments according to the present invention will be disclosed with reference to the attached drawings.

[1. Overall Picture of Data Processing System]

The present invention relates a data processing system for appropriately synchronizing transactions to be executed at several machines connected to a network.

A data processing system (called the present system hereinafter) according to embodiments of the present invention is explained briefly before the detail disclosure.

The present system handles databases (lexicon sets) and transactions. In detail, the present system controls transactions or processing of "transcribed" data in an appropriate order. The transactions may be accepted at several machines connected to the network or transferred from replica sites at which replica data have been resident, which will be disclosed later. The "transcribed" data is transferred from an original site so that it can be reflected on replica sites, which will also been disclosed later.

Figure 1:
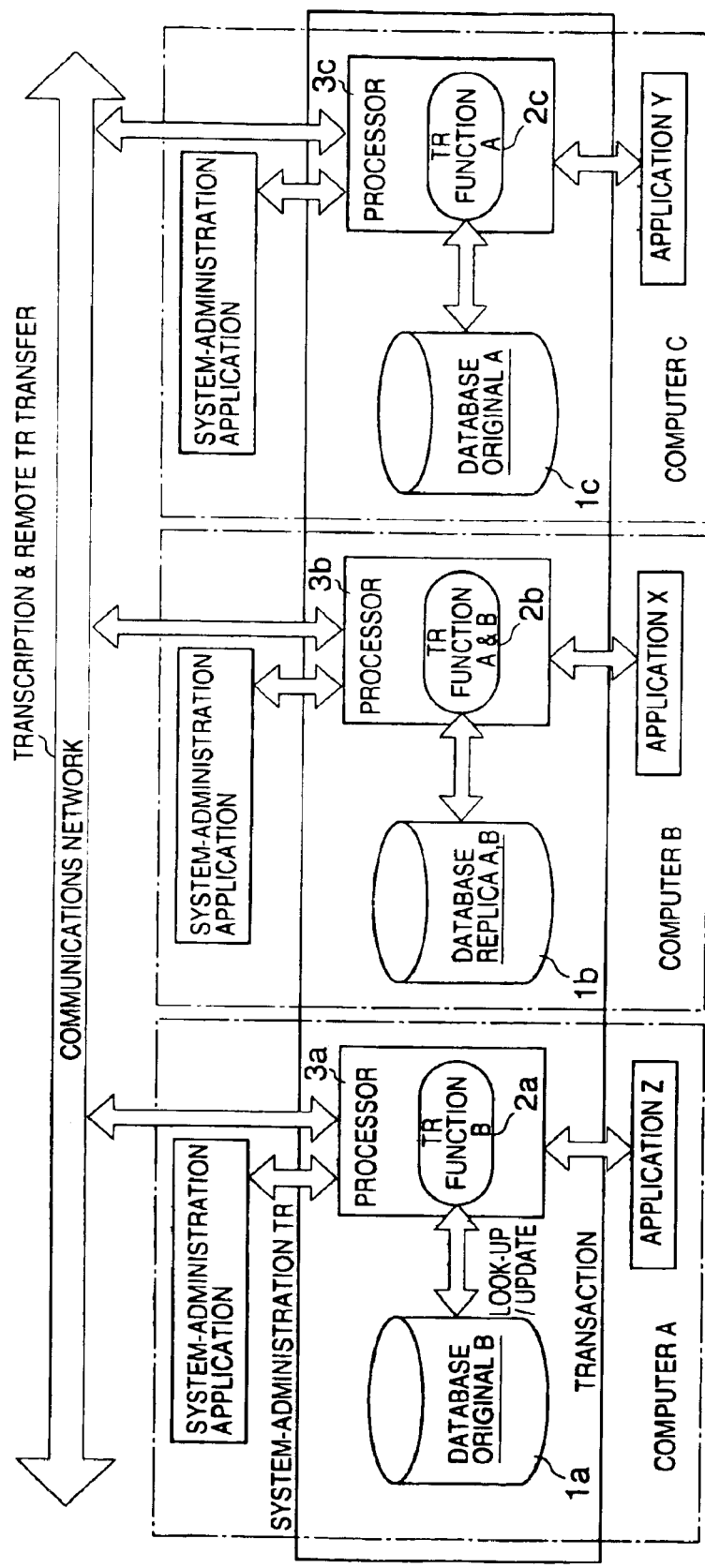
FIG. 1 shows the overall architecture of a data processing system according to embodiments of the present invention.

FIG. 1 shows the architecture of a data processing system according to the present invention.

The present system includes several computers A, B, C, . . . (each being called a host), as shown in FIG. 1, connected via a communications network. Provided in main-memory areas of the hosts A, B and C are databases $1a$, $1b$ and $1c$, respectively, and also transaction (TR) functions $2a$, $2b$ and $2c$, respectively, used for accessing the corresponding databases.

One or more of applications will run on each host. Therefore, different applications will mostly run on hosts when the present system includes several hosts. In detail, each of applications X, Y and Z provided outside the present system accesses the database of the corresponding host for necessary processing. More precisely, each of the applications X, Y and Z makes requests for procedures such as looking-up and updating to the corresponding transaction function $2a$, $2b$ or $2c$ pre-registered in the present system via the corresponding processor $3a$, $3b$ or $3c$. On receiving the processing results, each application performs a necessary procedure for execution of programs in addition to accessing the corresponding database. Usually, the applications X, Y and Z perform front-end procedure such as displaying on monitor screen and printing.

(Database)

Figure 2:
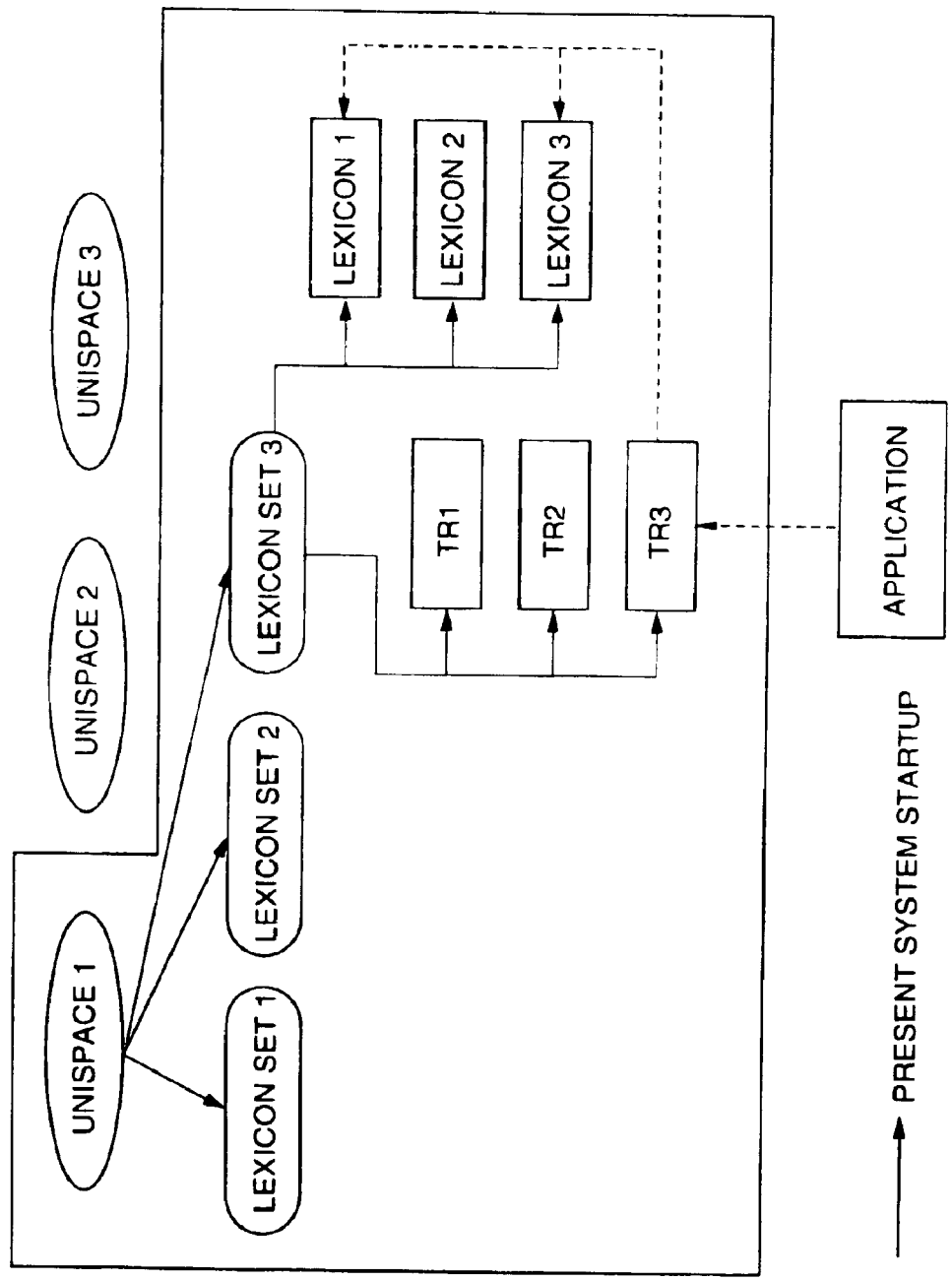
FIG. 2 illustrates a uni-space structure.

Each of the databases $1a$, $1b$ and $1c$ in the present system includes one or more of lexicons. A lexicon is a unit for selective accessing data in a lexicon set or giving attributes to the data. Lexicons are discriminated from each other by their (lexicon) names. Lexicon sets are also discriminated from each other by their (lexicon-set) names because a uni-space can contain several lexicon sets, as illustrated in FIG. 2, in the environment for executing the present system. Several uni-spaces are also discriminated from each other by their (uni-space) names because the present system can be structured as several systems for managing several uni-spaces, or several different lexicon sets, via a common network on a physical machine.

The original data of a lexicon set stored in the database of one of the hosts has been stored at another host, and its replica data has been stored at still another host. For example, in FIG. 1, the original data for data B has been stored at the host A (computer A), and that for data A has been stored at the host C (computer C). The replica data for the data A and B have been stored at the host B (computer B). The data-updating procedure can be allowed to the original data only, not to the replica data in the present system.

(Transaction)

A unit of procedures for data looking-up and updating executed in response to one request from an application is called a transaction. A transaction corresponds to a "transaction function" in which detailed procedures are stated. Transaction functions (TR functions) A and B shown in FIG. 1 are used to access the database of the corresponding machine for realization of a necessary procedure shared by the applications X, Y and Z. In other words, the applications X, Y and Z do not directly access the corresponding databases but via the corresponding transaction functions in the present system.

A transaction includes identifiers (such as a transaction name) for giving data several types of attributes. A transaction function to be executed may be set so that it corresponds to the identifiers. A necessary number of identifiers can be prepared in accordance with the types of attributes to be given.

A transaction can handle only one lexicon set in the present invention. A uni-space can include several lexicon sets, so that a lexicon-set name to be operated is stated in a transaction. The lexicon-set name may be one of the identifiers. Statement of a lexicon-set name in a transaction is not a must because a lexicon set to be operated can be found by using another identifier.

The present system processes a data-operation request from an application per transaction. The updating procedure to the original data is also executed per updating TR. Moreover, a necessary procedure to the replica data is executed at a replica site per original updating TR so that the replica data can reflect changes in the original data due to the updating procedure with the function called "transcription", which will be explained later.

(Major Purpose of the Present System)

The major purpose of the present system is to achieve synchronization of several transactions. The synchronization of transactions is, for example, achieved for two machines connected to a network, at which different types of applications are running independently. Whenever, an updating transaction for data updating issued by one of the applications is executed, the other application executes a look-up transaction to receive the updated data contents immediately.

In detail, the present system is provided with a peculiar function as the means of synchronizing transactions. For the function, transactions themselves correspond to data items (portions) appointed as the target of monitoring. The transaction corresponding to an updated data item is executed just after an updating transaction has been executed for updating the data item or processing "transcribed" data of the updated data item but before execution of other transactions or processing "transcribed" data of other data item to be reflected on several replica sites. Completion of these procedures or executed results is informed to each application.

This function achieves synchronization of updating and look-up transactions among several independent applications resident at different machines.

Another purpose of the present system is to maintain databases (lexicon sets) as containing identical contents over several machines. In detail, several machines hold duplicates of a database, and when a database at one machine has been updated, the updated information (the contents of updating) is transmitted to other machines via a communications network so that the databases at the other machines can reflect the updating, to fulfill the purpose. This function is called "transcription" in the present invention. Data transmitted by the function "transcription" is called "transcribed" data in the present invention.

A machine that is authorized to update a database is called an original site for the database and data in the database is called an original data in the present invention. Other machines that hold duplicates of that database are called replica sites and data in each duplicate of the database is called replica data in the present invention.

The present system executes a transaction (updating TR) for updating a database at the original site. With the function "transcription", the system further handles several duplicate databases as logically seen as one database from the application of each machine. The application of each machine therefore does not need to know about which machine is the original site. This system architecture is called "remote/local architecture" in the present invention.

In the present system, until a unit of execution of a transaction and a necessary procedure to replica data so that it can reflect changes in "transcribed" data has been completed for a database (lexicon set), another transaction procedure (and also a procedure on another "transcribed" data) for the database will not be executed at each host. In other words, another transaction procedure and a procedure on another "transcribed" data have to wait for the completion of all the execution described above.

In other words, a transaction procedure and a procedure on "transcribed" data for one database (lexicon set) of one machine are serially executed per transaction. Therefore, an application that has requested a transaction will not access a database to which another transaction is running.

A transaction for data searching and looking-up only with no updating procedure is called a looking-up transaction in relation to an updating transaction. The function "transcription" in the present system achieves quick matching between original data and replica data per transaction. This allows a look-up transaction to handle the replica data of a machine (local machine) that has received the request for the transaction.

The communications network in the present system is a means of achieving the function "transcription" in which an original site transmits "transcribed" data to replica sites. It is also a means of transmitting an updating transaction issued (requested) at a replica site to the original site. The function of executing the updating transaction at an original site is achieved by transmitting the updating transaction issued at a replica site to the original site via the communications network.

[2. Definition of Technical Terms]

Meaning of several technical terms used in this specification will be explained before disclosure of the embodiments.

A "uni-space" is defined as involving several databases (lexicon sets) to be handled by the present system, as shown in FIG. 2. A uni-space acts as an identifier for identifying each data and data-access service (looking up and updating). A uni-space name is thus given to each uni-space.

A lexicon is a subset defined for data being shared by several machines (called common data hereinafter) and constituting each uni-space. It is possible to decide whether or not to provide machines with the common data per lexicon set. Several types of procedures are performed per lexicon set in the present system.

A lexicon set has an indexing function for high-speed accessing to data (called common data hereinafter). Listed below are basic data-structures for a lexicon set.
- (a) LEXICON: a subset of a lexicon set, belonging to a lexicon set;
- (b) CELL: data-storing array, having attributes of type (data type), capacity (length of alignment) and count (effective length as a key for sorting), belonging to a lexicon set;
- (c) CONTEXT: data (CELL array) for giving CELLs a linear relation, having an attribute of capacity, belonging to a lexicon set;
- (d) ROW: data for appointing a sort key for a part of CONTEXT, having attributes of row length and key length, belonging to a lexicon set; and
- (e) FACADE: data for sorting ROW for data searching, a main element for the indexing function, belonging to a lexicon set.

A transaction is an operation of looking-up or updating common data in response to a request from an application program. A set of data operated by a transaction at once is one lexicon set only.

Local site: self-site when looked from an application;
Remote site: other sites when looked from an application;
Original site: a site holding original data; and
Replica site: sites holding replica (duplicate) data.

Local Looking-Up: This transaction operation to is allowed only to look up common data, executed as accessing to completely local main-memory data, with no network traffic.

Local Updating: This is an updating function for an original site at which an application has issued a transaction. This function allows the original site to update data, and then to multicast the updated data to other sites so that several hosts can always use the identical data.

Remote Updating: This is an updating function for each replica site at which an application has issued a transaction. This function does not allow the replica site to update data because it is a replica data. The transaction is transmitted to an original site for data updating. "Transcribed" data is transmitted by the function "transcription" so that several hosts can always use the identical data. Replica sites with no such application that has issued this transaction can receive "transcribed" data from the original site. This allows several hosts to always use the identical data.

"Transcription" is a function of transmitting data updated by updating transaction to other machines from a specific machine by multicasting.

"Retriever" is a function for a self-site to take lexicon-set data from another running machine so that the self-site can handle the lexicon-set data at the self-site.

[3. Embodiment and Computer]

The embodiment and modifications in the present invention are achieved on a computer. Several functions in the embodiment and modifications are performed by specific procedures (programs) that run on the computer.

Each "means" disclosed in this specification is a conception of the corresponding function in the embodiments and the modifications.

Each "means" thus does not necessarily have one-to-one correspondence with a specific hardware or a software routine.

In detail, one hardware element acts as several means on different occasions. For example, a computer acts as a means for executing a command and acts as another means for executing another command. One means may be achieved by one command or several commands on different occasions.

The embodiment and the modifications will be disclosed with imaginary circuit blocks (means) representing several functions.

Several steps in each procedure in the present invention can be executed in different step order, simultaneously or in different step order per execution. The order of steps can be changed by a menu-type interfacing technique in which a user selects an executable procedure.

[4. Embodiment]

The first embodiment employs an alteration-synchronizing transaction, a unique function for the data processing system.

This function achieves synchronization of transactions over several transactions. The synchronization of transactions is, for example, achieved for two machines connected to a network, at which different types of applications are running independently. Whenever, an updating transaction for data updating issued by one of the applications is executed, the other application executes a look-up transaction to receive the updated data contents immediately.

[4-1. Architecture in Embodiment]

Figure 3:
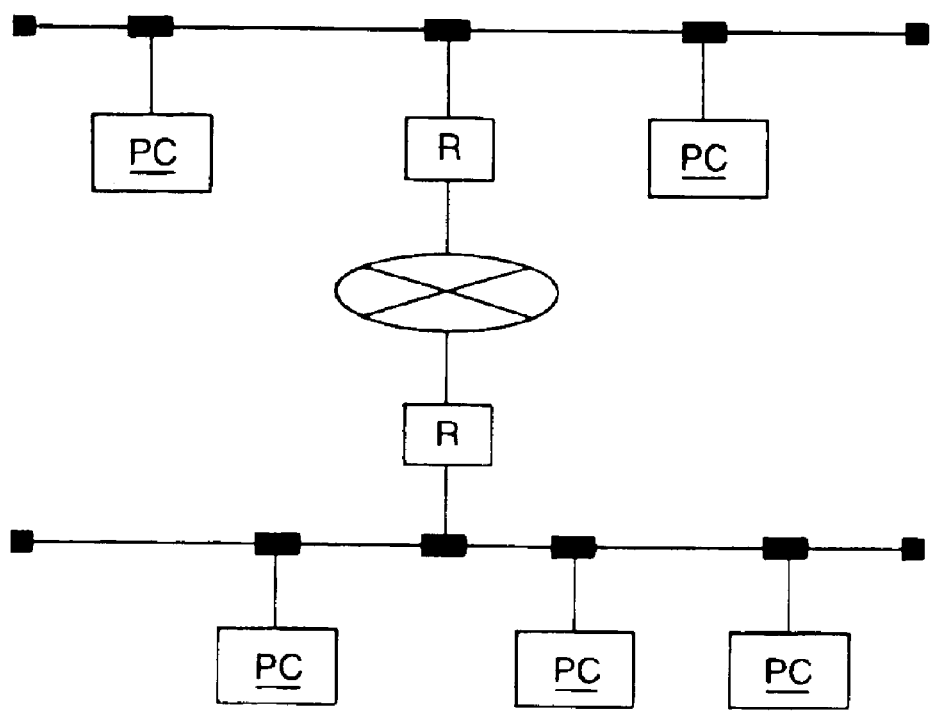
FIG. 3 illustrates an example of a network architecture to which a data processing system according to an embodiment of the present invention is applied.

FIG. 3 illustrates an example of a network architecture to which the present system is applied.

Shown here is a conceptual network in which two LANs are connected to each other by LAN via routers R, with several personal computers PC connected to each LAN. A network to which the present system is applied can be freely modified in which WAN is not necessarily provided and any type of severs can be provided in each LAN.

Figure 4:
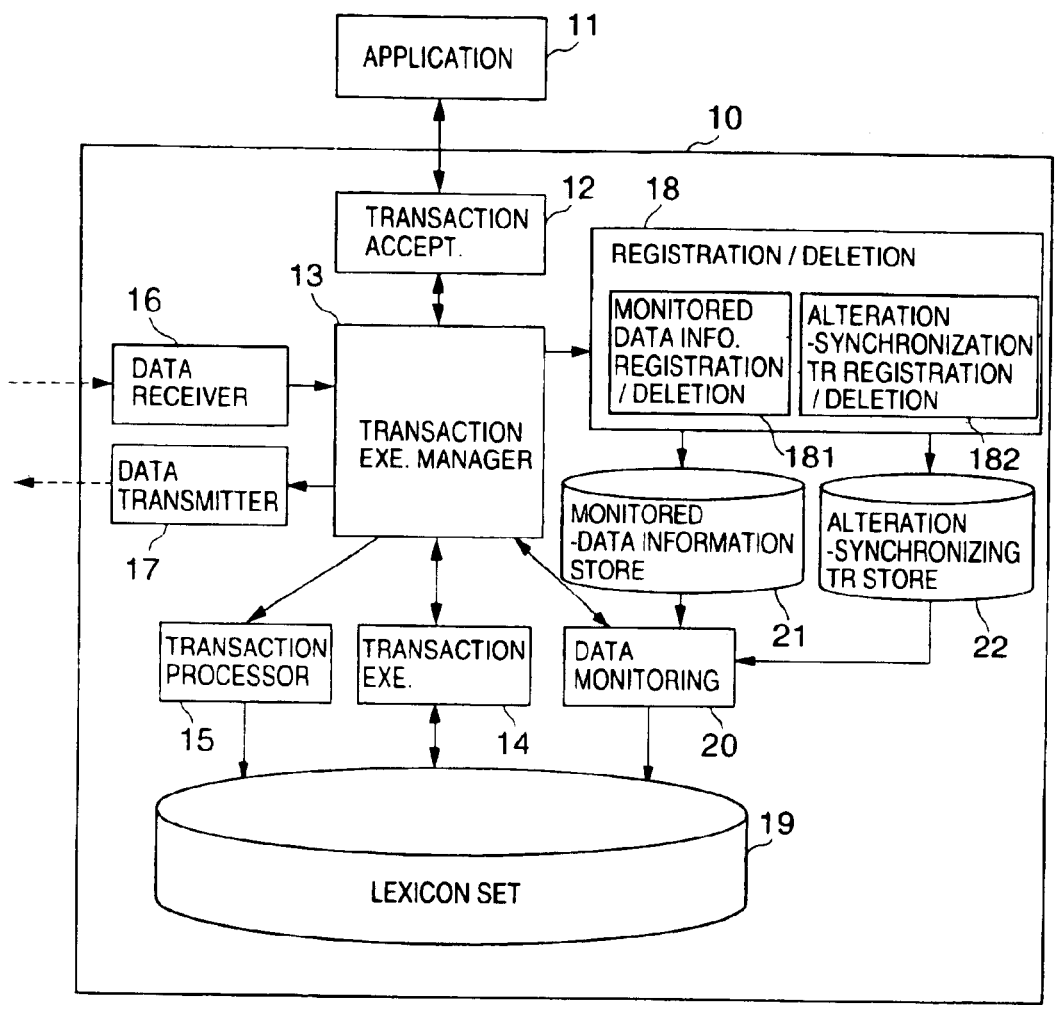
FIG. 4 shows a block diagram of a data processing apparatus as an embodiment of the present invention.

FIG. 4 shows a functional block diagram of a data processing apparatus 10 provided in each machine for executing alteration-synchronizing transaction in the present system. The data processing apparatus 10 shown in FIG. 4 corresponds to each of the processor 3a, 3b and 3c shown in FIG. 1 and disclosed in [Overall Picture of Data Processing System].

The data processing apparatus 10 is equipped with a transaction-accepting section 12 for accepting a transaction-execution request from an application 11; a transaction-execution management section 13 for managing execution of a transaction at a self-site; a transaction-executing section 14 for calling a transaction function used for executing a transaction and executing the transaction using the transaction function; a "transcription" processor 15 for making data at a self-site to reflect changes in "transcribed" data; a data receiver 16 and a data transmitter 17.

The data transmitter 17 performs transmission of remote TR to an original site and "transcribed" data to other sites, as disclosed later. The data receiver 16 receives remote TR from a replica site and "transcribed" data from other sites.

The data processing apparatus 10 is also equipped with a registration/deletion section 18 for registering or deleting alteration-synchronizing transactions, a data-storing section 19 for storing a lexicon-set as original or replica data, a data-monitoring section 20 for monitoring whether data stored in the data-storing section 19 has been altered. Data to be monitored by the data-monitoring section 20 may be a cell, a specific data, or a facade, a set of specific data.

The registration/deletion section 18 is equipped with a monitored data-information registration/deletion section 181 for registering or deleting positional information on data to be monitored as to whether the data contents have been altered and an alteration-synchronizing TR registration/deletion section 182 for registering or deleting alteration-synchronizing transactions that will be executed when data under monitoring has been altered.

Positional information on the monitored data, that has been registered by the monitored data-information registration/deletion section 181 is stored in a monitored-data information storing section 21. A alteration-synchronizing transaction registered by the alteration-synchronizing TR registration/deletion section 182 is stored in an alteration-synchronizing TR storing section 22.

The following procedures will be proceeded when data under monitoring has been altered at each host provided with the data processing apparatus 10.

[4.2 Procedures]

An application program in this system is allowed to pre-register a transaction at each host, which will be called when a pre-appointed data (per cell or facade) is altered at each host. This transaction to be executed just after an event such as data updating or alteration is termed as an alteration-synchronizing transaction, different from usual transactions.

The alteration-synchronizing transaction can be used for (1) a procedure to be executed just after alteration to an appointed data, (2) informing the application program of an updating event to an appointed data, etc.

Registration of the alteration-synchronizing transaction at each host requires a registration transaction which will be executed at each local site (self-site). The alteration-synchronizing transaction is also required to be registered at each local site because it is executable at any site at which an application program is resident, regardless of whether the site is the base site at which data appointed by a local site is resident.

In other words, the execution of an alteration-synchronizing transaction requires a registration transaction for registering the alteration-synchronizing transaction and this transaction which will be automatically executed just after data alteration such as updating.

Figure 5:
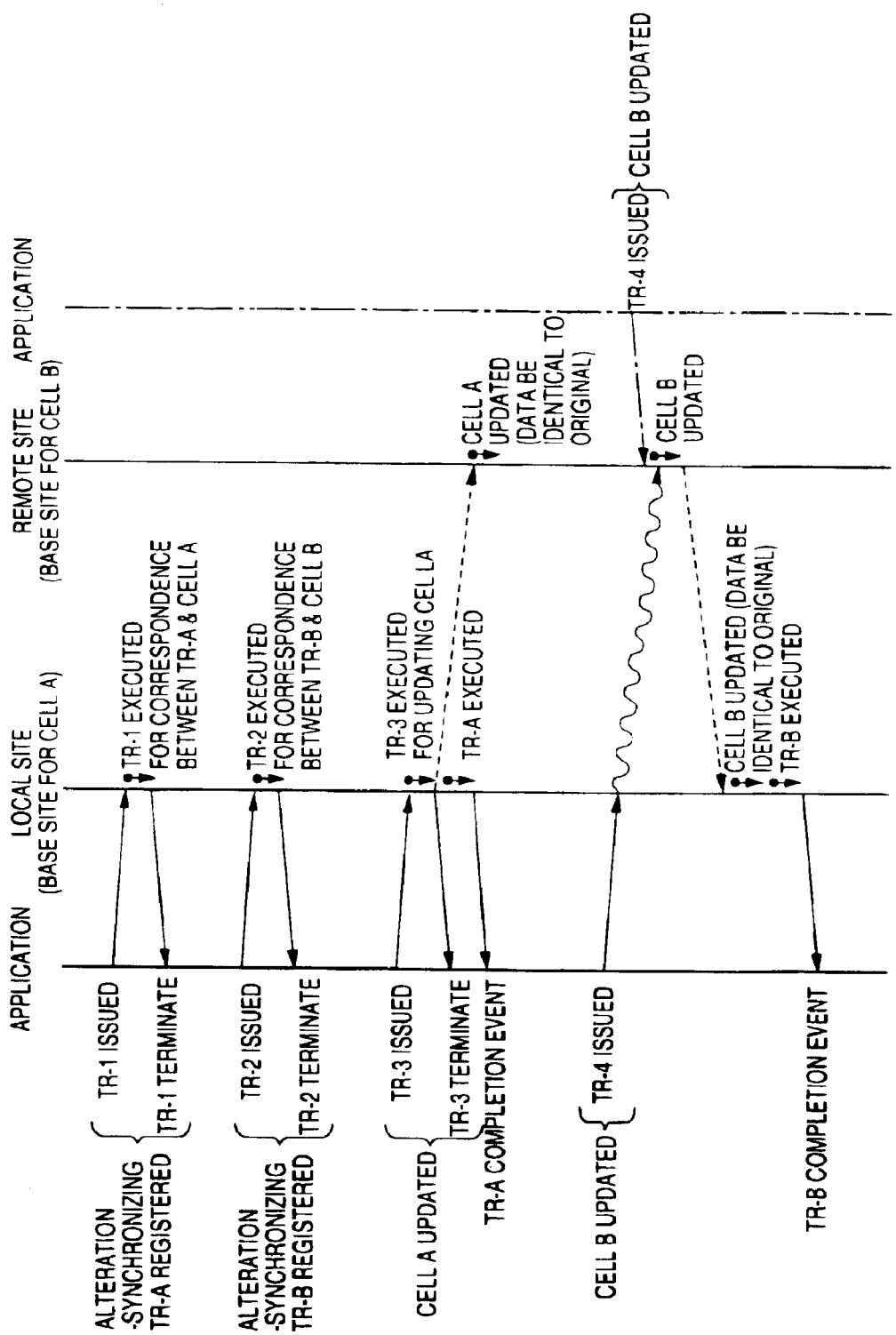
FIG. 5 illustrates an alteration-synchronizing transaction procedure performed by the data processing apparatus.

Disclosed next with reference to FIG. 5 is a alteration-synchronizing transaction procedure performed by the data processing apparatus 10.

A local site shown in FIG. 5 is the base site at which data "cell A" is resident. A remote site also shown in FIG. 5 is the base site at which data "cell B" is resident. The data "cell A" and "cell B" are included in data to be used by an application program resident at each site in the network.

An application program at the local site issues a transaction TR-3 for "cell A"-updating, as indicated in the middle of FIG. 5. The transaction TR-3 is then executed at the local site as the base host at which the data "cell A" is resident, for "cell A"-updating. The transaction TR-3 terminates when the data "cell A" has been updated at the local site.

Simultaneously with the termination of the transaction TR-3, the updated contents of the data "cell A" (original data) are transmitted to other remote sites. Data "cell A" (replica data) resident at each remote site is rewritten with the updated data "cell A".

The procedure for making the original data at the base site and the replica data at the remote sites identical to each other is called "transcription" in this invention. The procedure "transcription" is indicated by a dot line in FIG. 5.

There are demands for executing several procedures in response to the completion of "cell A"-updating, such as, looking up the updated data contents, searching, sorting and recalculation after the data updating.

Each procedure after the "cell A"-updating is performed with execution of an alteration-synchronizing transaction pre-registered in the data processing apparatus 10 that will execute the transaction, not in an application program.

In detail, a particular transaction which will be executed after the "cell A"-updating at the local site is registered as an alteration-synchronizing TR-A. Another transaction which will be executed after the "cell B"-updating is registered as an alteration-synchronizing TR-B.

These registration procedures are performed by the application program. In detail, the application program issues registration transactions "TR-1" and "TR-2" for registration of the alteration-synchronizing TR-A and alteration-synchronizing TR-B, respectively. The correspondence between the data "cell A" and "cell B" to be monitored and the alteration-synchronizing TR-A and the alteration-synchronizing TR-B which will be executed after "cell A"-and "cell B"-updating, is made by the registration transactions TR-1 and TR-2, respectively.

After registration of the alteration-synchronizing transactions, a transaction TR-3 for "cell A"-updating is executed at the local site when it is issued by the application program at this site. On completion of the "cell A"-updating, the transaction alteration-synchronizing TR-A corresponding to the data "cell A" is executed. After execution of this transaction, its completion event is informed to the application program.

The application program at the local site can further issue a transaction TR-4 for updating the data "cell B" for which the original data is resident at another site.

The transaction TR-4 for "cell B"-updating is transmitted, as a remote transaction, to the remote site as the base site for the data "cell B" and then the original data of the data "Cell B" is updated at this remote site. This is because the original site is only allowed for data-updating in the network system constituted by several hosts each having the data processing apparatus 10. The remote transaction is indicated by a wavy line in FIG. 5.

The updated contents of the data "cell B" (original data) is transmitted from the remote site to the local site and then data "cell B" (replica data) at the local site is updated by the procedure "transcription", followed by execution of the alteration-synchronizing TR-B corresponding to the data "cell B" at the local site.

Disclosed so far is the execution of the updating transaction for the data "cell B" resident at the remote (base) site by the application program resident at the local site.

Instead, the data "cell B" may be updated by execution of an updating transaction issued from another site, such as, the base site for the data "cell B" or any replica site for this data. The updated contents of the data "cell B" is transmitted to the to the local site and then data "cell B" (replica data) at the local site is updated by the procedure "transcription", followed by execution of the alteration-synchronizing TR-B corresponding to the data "cell B" at the local site.

As disclosed above, when the self-site is the base site for the data "cell A" under monitoring, and it is updated at the self-site, the procedure "transcription" is performed so that the updated contents can be reflected on data resident at other sites. When data under monitoring at the self-site is replica data such as the data "cell B", its alteration is executed by the procedure "transcription" from another site (the base site for the data "cell B").

[4-3. Operation of Embodiment]

Figure 6:
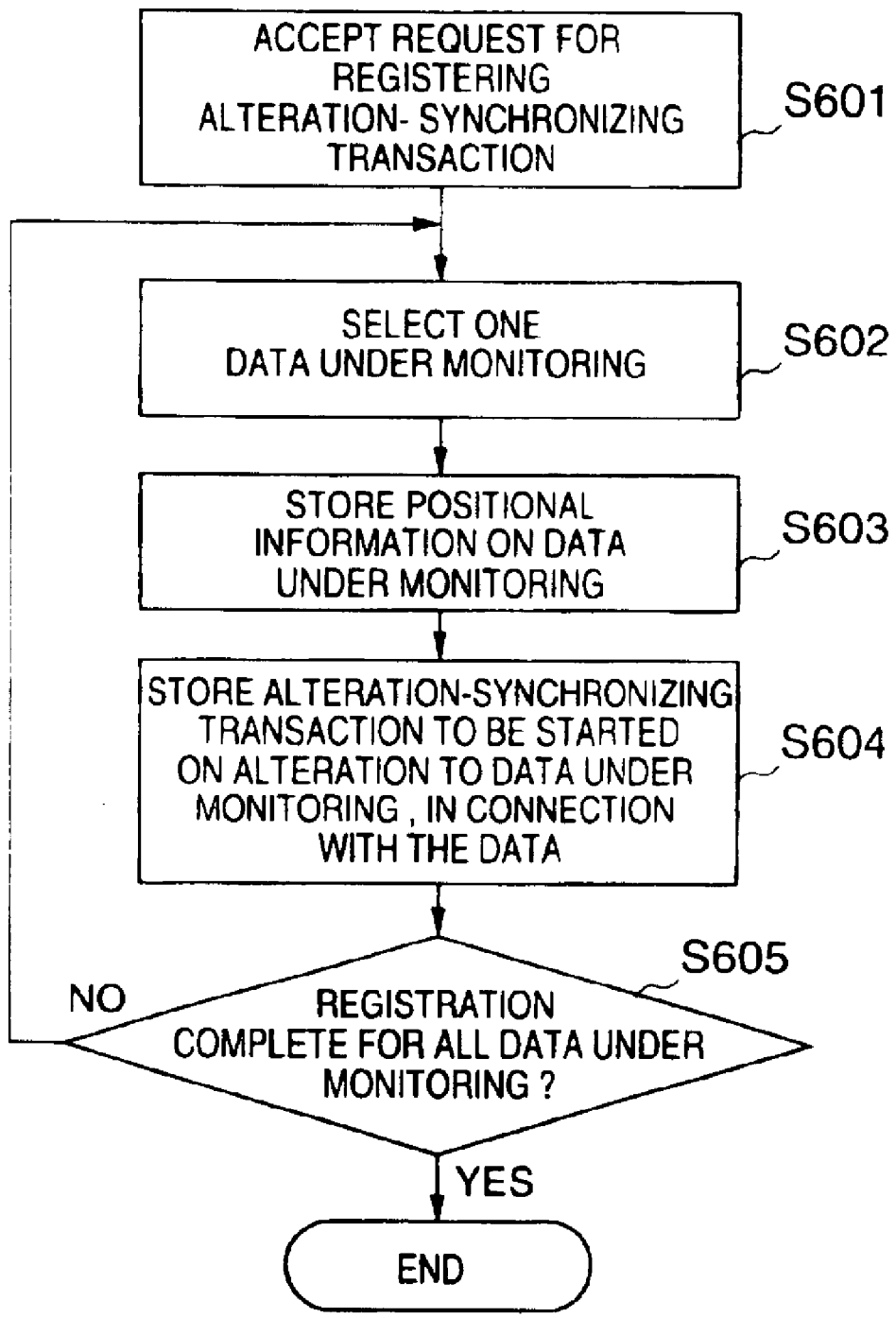
FIG. 6 is a flowchart showing procedures of registration/deletion of alteration-synchronizing transactions.
Figure 7:
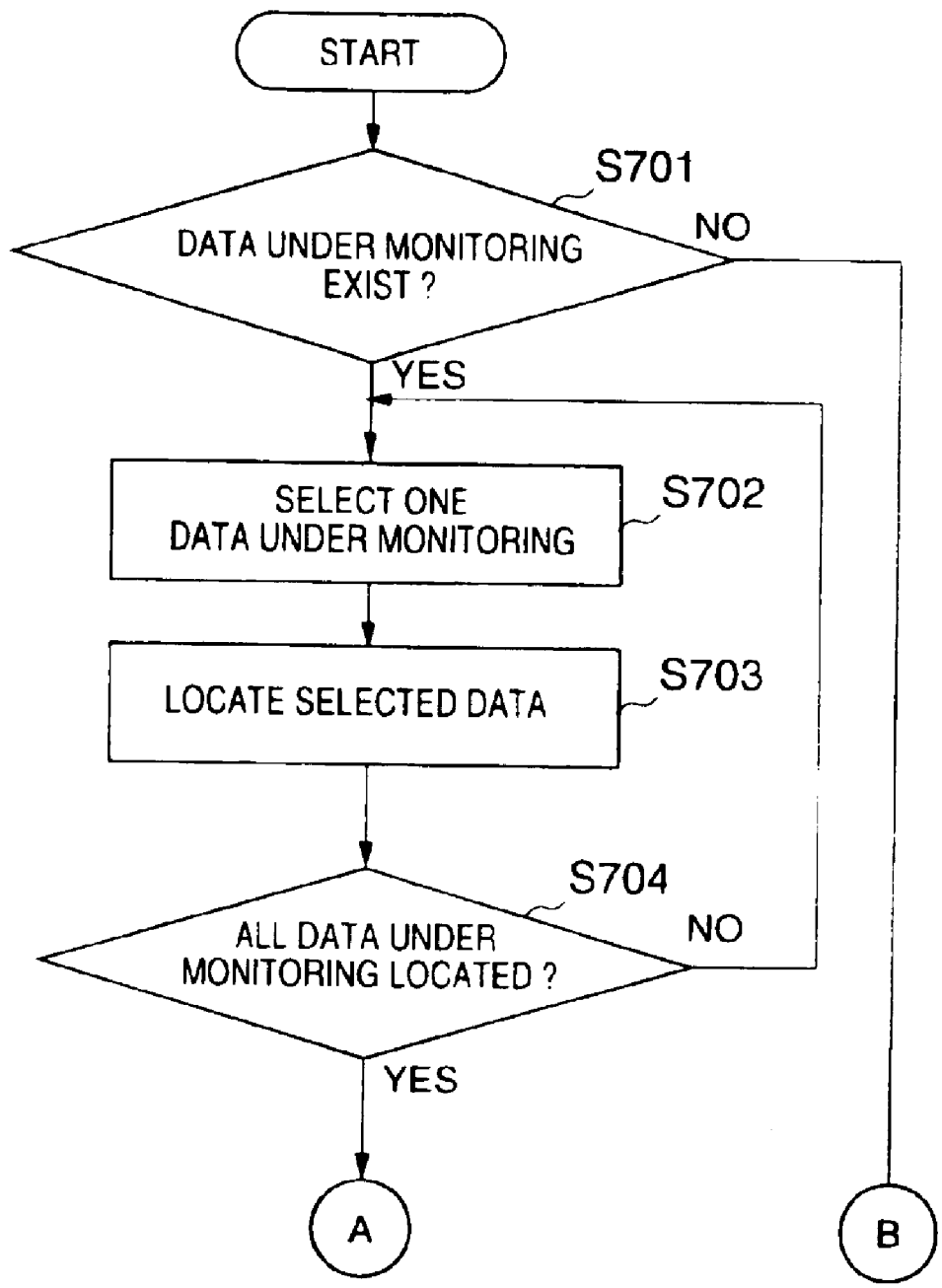
FIG. 7 is a flowchart showing a procedure (the former part) of executing alteration-synchronizing transactions.

Disclosed net with reference to the flowcharts shown in FIGS. 6 and 7 are registration and execution of alteration-synchronizing transactions explained above.

Data alteration can be monitored in this embodiment not only for each data such as "cell A" and "cell B" disclosed above but also each facade, a group of data.

[4-3-1. Registration and Deletion of Alteration-Synchronizing Transaction]

As shown in FIG. 6, when the transaction-execution management section 13 accepts a request for registering an alteration-synchronizing transaction (S601), it selects one data under monitoring, such as "cell A" shown in FIG. 5, (S602). The alteration-synchronizing transaction is, for example TR-A shown in FIG. 5, and its registration is requested from a registration transaction, such as, TR-1 shown in FIG. 5, issued by the application program 11 (system-administration application program or user application program).

The monitored data-information registration/deletion section 181 stores positional information on the selected data under monitoring in the monitored-data information storing section 21 (S603). An alteration-synchronizing transaction is stored in the alteration-synchronizing TR storing section 22 in connection with the data under monitoring by the alteration-synchronizing TR registration/deletion section 182 (S604). The stored alteration-synchronizing transaction will be started when the data under monitoring is altered.

It is examined (S605) whether the above registration procedure has been completed for all data under monitoring, such as registration of data "cell C" other than the data "cell A" and an alteration-synchronizing transaction TR-C other than TR-A by the registration transaction TR-1.

If not completed yet for all data under monitoring (NO in S605), the procedure returns to step S602 to select the next data under monitoring, such as the data "cell C", followed by registration of the alteration-synchronizing transaction TR-C for the data "cell C", and so on. If completed for all data under monitoring (YES in S605), the procedure ends.

Deletion of registered alteration-synchronizing transactions is also performed by the monitored data-information registration/deletion section 181 and the alteration-synchronizing TR registration/deletion section 182. The deletion procedure is not disclosed in detail because it is similar to the above registration procedure. It can be proceeded according to the flowchart shown in FIG. 6 in which "REGISTERING" and "STORE" is replaced with "DELETING" and "DELETE", respectively.

[4-3-2. Execution of Alteration-Synchronizing Transaction]

Figure 8:
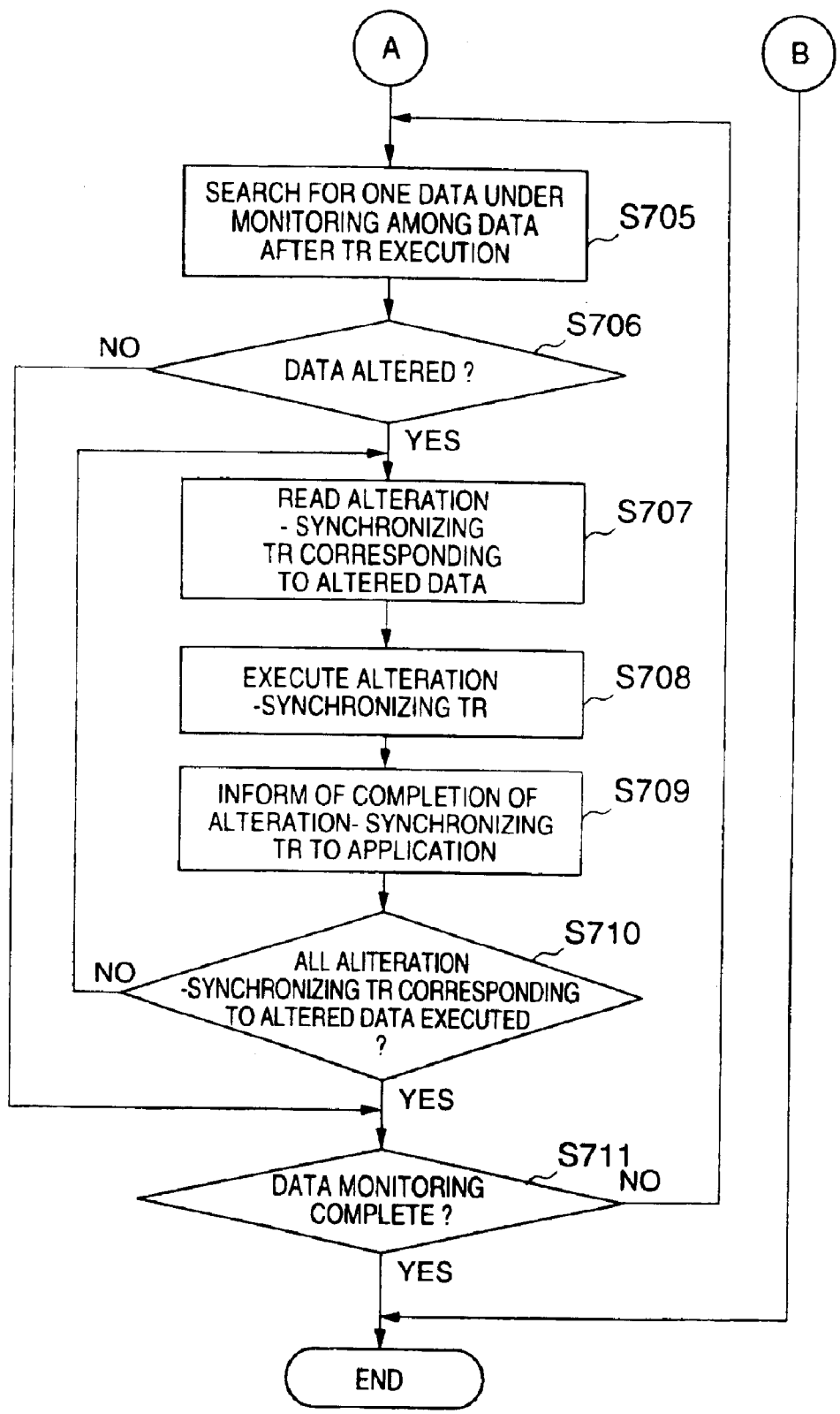
FIG. 8 is a flowchart showing the procedure (the latter part) of executing alteration-synchronizing transactions.

Execution of alteration-synchronizing transactions is disclosed next with reference to FIGS. 7 and 8.

On execution of a transaction requested by an application program, it is examined (S701) whether there is data under monitoring stored in the monitored-data information storing section 21, which is performed by the data-monitoring section 20 of the data processing apparatus 10.

If there is no data under monitoring (NO in S704), the procedure ends. On the other hand, if there are (YES in S704), one of the data (such as "cell A") stored in the monitored-data information storing section 21 is selected (S702). The selected data is then located (S703).

It is examined whether all data under monitoring have been located (S704). The selection and locating procedures are repeated if there are several data under monitoring such as the data "cell B" shown in FIG. 5 (NO in S704).

If all data under monitoring have been located (YES in S704), the data-monitoring section 20 it monitors whether there is alteration to these data under monitoring. In detail, the data-monitoring section 20 searches for one data under monitoring among data after transaction execution (S705). This is because the data-monitoring section 20 has been informed of the location of the altered data from the transaction-execution management section 13.

When the data under monitoring has been altered while the data-monitoring section 20 has been monitoring the data, or it is found in the data after transaction execution (YES in S706), the data-monitoring section 20 reads the alteration-synchronizing transaction corresponding to the altered data from the alteration-synchronizing TR storing section 22 (S707).

The alteration-synchronizing transaction is sent to the transaction-execution management section 13 which then requests the transaction-executing section 14 for execution of the transaction (S708).

On completion of the transaction, the transaction-executing section 14 informs the transaction-execution management section 13 of the execution of the transaction, for registration of the monitored-data information and the alteration-synchronizing transaction (S709).

When the data "cell A" under monitoring has been altered, the alteration-synchronizing transaction TR-A is read, whereas when the data "cell B" under monitoring has been altered, the alteration-synchronizing transaction TR-B is read in step S707. Then, the alteration-synchronizing transaction corresponding to the data "cell A" or "cell B" is executed in step S708.

When data under monitoring must be identical over several hosts, the transaction-execution management section 13 acknowledges it and carries out the procedure "transcription", as disclosed with reference to FIG. 5.

Data communications over several hosts for the procedure "transcription" is performed via the data transmitter 17 and the data receiver 16.

When the self-host has receives data from another host through the procedure "transcription", any alteration to the "transcribed" data is reflected on data resident at the self-site by the transaction-execution management section 13 and the "transcription" processor 15.

On completion of an alteration-synchronizing transaction in step S709, it is examined whether all alteration-synchronizing transactions corresponding to the altered data "cell A" under monitoring have been executed (S710).

If there is (are) non-executed alteration-synchronizing transaction(s) (NO in S710), the procedure returns to step S707 for repetition of steps S707 to S710. On the contrary, if all alteration-synchronizing transactions corresponding to the data under monitoring have been executed (YES in S710), the procedure goes to step S711 to make decision for further data monitoring. If decided to continue data monitoring (NO in S711), the procedure returns to step S705 for data monitoring. On the other hand, the procedure ends, if data monitoring has been completed (YES in S711). The registration information on the data under monitoring and the alteration-synchronizing transactions will not be deleted even though the procedure ends.

[4-4. Advantages in Embodiment]

The data processing apparatus in the embodiment is provided with the means of monitoring alterations to data under monitoring, so that the present system requires no mechanisms of periodically monitoring data alterations in each application, which may otherwise be required like the known system.

Moreover, the data processing apparatus in the embodiment monitors data alterations on each completion of a transaction, so that any alteration made to data under monitoring is immediately detected. This requires no data-monitoring period settings in each application. The application's job is just waiting for notification of alterations made to data under monitoring.

Furthermore, the data processing apparatus in the embodiment pre-registers alteration-synchronizing transactions to be executed when any alteration is made to data under monitoring, in relation to these data, so that the apparatus can execute pre-registered programs when any alteration has been made to the data with no specific mechanisms in application.

In detail, it is assumed that an updating transaction issued from one of two types of applications independently running at two machines in the network has been executed and then data under monitoring has been altered.

A pre-registered alteration-synchronizing transaction, such as, a look-up transaction is then executed, just after the execution of the updating transaction or the procedure "transcription" that follows this transaction, but before execution of another transaction or the procedure "transcription" that follows this transaction. This achieves synchronization of the updating transaction and the look-up transaction between the applications independently running at different machines.

Moreover, when any alteration has been made to data under monitoring and then the alteration-synchronizing transaction corresponding to the altered data has been executed, the completion of the alteration-synchronizing transaction is informed to a client that requested execution of a transaction for registration of information on monitored data and the corresponding alteration-synchronizing transactions. The client can therefore request execution of other transactions, execute different middleware or its own programs and terminate other programs.

[Modifications]

The followings are several modifications to the embodiment disclosed above.

The several machines are expressed as physically different machines and communications network is expressed as a communications means including physical medium among the machines in the embodiments. The several machines may however be expressed as different procedures (logical machines) in one machine. Each logical machine may be identified with means such as a procedure ID.

Transaction functions are called for execution of transactions in the embodiment. Transactions may however be executed in different ways. For example, each transaction may have a statement of detailed data-operating procedures. The present system then interprets and executes the procedures.

A network via which "transcribed" data are transmitted and that via which transactions are transmitted may be physically/logically same or different from each other. A multi-cast/broadcast network may be efficient for data transmission over several replica sites. It is however not a must in the present invention. One-to-one communications is enough for transaction transmission. However, the multi-cast/broadcast network may also be available under the requirements that transactions received at sites which are not allowed to execute these transactions be deleted or not to be executed.

The present invention achieves synchronization of transactions between two types of applications independently running on several computers connected via a network, as disclosed above.

Not only that, however, the present invention achieves synchronization of transactions between applications independently running on one machine. A data processing apparatus for this purpose may be equipped with a transaction-accepting section for accepting a transaction-execution request; a transaction-execution management section for managing execution of a transaction; a transaction-executing section for executing a transaction; a registration/deletion section for registering or deleting positional data on data to be monitored for data alteration in a database and also alteration-synchronizing transactions to be executed in response to alteration made to the data under monitoring, in relation to the altered data; and a data monitoring section for monitoring whether the data under monitoring has been altered.

Explained next is how to use the synchronously executable transactions.

The following example is current monitoring with control for abnormal current values.

Terms used in this example:

Monitor: Monitors currents and asks a controller for taking measures against abnormal current values.

Controller: Takes a measure such as current-amount control and current shut-down, when an abnormal current value is reported from the monitor.

EXAMPLE

It is assumed that there are a series of specific procedures to be executed by the controller against abnormal current amounts. The present system in this invention can automatically execute the series of specific procedures. The abnormal can be controlled with specific procedures predefined and installed in the present system.

For these procedures, in FIG. 4, the monitored data-information registration/deletion section 181 registers data to be monitored with abnormality flags. Further, the alteration-synchronizing TR registration/deletion section 182 registers a transaction to be executed when any abnormality flag has been altered.

The data registered by the monitored data-information registration/deletion section 181 are stored in the monitored-data information storing section 21. The transaction registered by the alteration-synchronizing TR registration/deletion section 182 is stored in the alteration-synchronizing TR storing section 22.

After registration, the data-monitoring section 20 monitors the data with the abnormality flags, when any data is altered, takes data on the transaction from the alteration-synchronizing TR storing section 22 and asks the transaction-execution management section 13 for execution of the transaction.

For these operations, an updating transaction to be periodically executed to write current values several times for 1 sec., is requested by the application 11. On generation of abnormal conditions in current value, an abnormality flag is recorded in the database though the updating transaction.

As disclosed, generation of abnormal conditions is appropriately controlled through execution of the registered transaction. On completion of monitoring, the registered data can be deleted by the registration/deletion section 18 (monitored data-information registration/deletion section 181 and alteration-synchronizing TR registration/deletion section 182).

The control explained above is achieved by the present system capable of executing the above procedures with detection of abnormal conditions within 1 sec. In other words, the known systems are available if a spontaneous control against generation of abnormal conditions is not required. On the contrary, the present system is useful for such a spontaneous control.

As disclosed above, the present invention can provide a processing system and a data processing method, in which several machines in a network co-operate to manage data so that identical data can always be resident at main-memory areas over the several machines even if any alteration is made to common data, with registration of alteration-synchronizing transactions at each host, which will be executed in synchronism with the data alteration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processing system for executing a transaction of accessing a database stored in each main-memory area of a plurality of computers connected via a network, a computer storing original data of at least a piece of data of the database being a base host, at least one another computer storing replica data of the original data as a replica host, each computer having an application, the data processing system comprising:

a transaction acceptor configured to accept a request for executing the transaction;

a transaction executor configured to execute the transaction;

a transcription processor configured to reflect updated data sent from the base host on the replica data;

a data monitor configured to monitor whether data has been altered; and a register and deleter configured to register or delete positional information on data to be monitored for alteration to the data contents and an alteration-synchronizing transaction to be executed when the data has been altered, the alteration-synchronizing transaction being registered/deleted in relation to the data, wherein, when the data monitor detects alteration made to the data which has been requested by an application, the alteration-synchronizing transaction registered in relation to the altered data is read out and executed by the transaction executor and completion of the execution of the alteration-synchronizing transaction is informed to the application that has requested the alteration.

2. The data processing system according to claim 1, wherein completion of the execution of the alteration-synchronizing transaction is informed to a computer that has requested for executing a transaction for registering information on data under monitoring and the alteration-synchronizing transaction related to the data under monitoring.

3. The data processing system according to claim 1, wherein the data monitor monitors the data per completion of one transaction of accessing a database.

4. A data processing method of executing a transaction of accessing a database stored in each main-memory area of a plurality of computers connected via a network, a computer storing original data of at least a piece of data of the database being a base host, at least one another computer storing replica data of the original data as a replica host, each computer having an application, the data processing method comprising:

registering positional information on data to be monitored for alteration to the data contents and an alteration-synchronizing transaction to be executed when the data has been altered, the alteration-synchronizing transaction being registered in relation to the data;

monitoring whether alteration which has been requested by an application program is made to the data under monitoring;

reading and executing the alteration-synchronizing transaction registered in relation to the altered data when the alteration is detected; and informing completion of the execution of the alteration-synchronizing transaction to the application that has requested the alteration.

5. The data processing method according to claim 4, wherein completion of the execution of the alteration-synchronizing transaction is informed to a computer that has requested for executing a transaction for registering information on data under monitoring and the alteration-synchronizing transaction related to the data under monitoring.

6. The data processing method according to claim 4, wherein the data is monitored as to whether alteration is made per completion of one transaction of accessing a database.

7. The data processing method according to claim 4, wherein when the data under monitoring is altered due to execution of a transaction issued by one of two types of applications running independently at two computers connected via the network, an alteration-synchronizing transaction pre-registered by the other application is executed on completion of the transaction issued by the one of two types of applications or on completion of a procedure for reflecting updated data sent from an original host storing the updated data under monitoring on the replica data, thus the two transactions running independently at the two computers being synchronized with each other.

8. A computer readable medium containing an executable data processing program for executing a transaction of accessing a database stored in each main-memory area of a plurality of computers connected via a network, a computer storing original data of at least a piece of data of the database being a base host, at least one another computer storing replica data of the original data as a replica host, each computer having an application, the program having instructions for:

registering positional information on at least a piece of data to be monitored for alteration to the data contents and an alteration-synchronizing transaction to be executed when the data has been altered, the alteration-synchronizing transaction being registered in relation to the data;

monitoring whether which has been requested by an application alteration is made to the data under monitoring;

reading and executing the alteration-synchronizing transaction registered in relation to the altered data when the alteration is detected; and informing completion of the execution of the alteration-synchronizing transaction to the application that has requested the alteration.

9. The computer readable medium according to claim 8, the program further having an instruction for informing completion of the alteration-synchronizing transaction to a computer that has requested for executing a transaction for registering information on data under monitoring and the alteration-synchronizing transaction related to the data under monitoring of completion.

10. The computer readable medium according to claim 8, the program further having an instruction for monitoring the data as to whether alteration is made per completion of one transaction of accessing a database.

11. The computer readable medium according to claim 8, wherein when the data under monitoring is altered due to execution of a transaction issued by one of two types of applications running independently at two computers connected via the network, the program further having an instruction for executing an alteration-synchronizing transaction pre-registered by the other application on completion of the transaction issued by the one of two types of applications or on completion of a procedure for reflecting updated data sent from an original host storing the updated data under monitoring on the replica data, thus the two transactions running independently at the two computers being synchronized with each other.

* * * * *